(12) United States Patent
Zhang et al.

(10) Patent No.: US 7,301,548 B2
(45) Date of Patent: *Nov. 27, 2007

(54) SYSTEM AND METHOD FOR WHITEBOARD SCANNING TO OBTAIN A HIGH RESOLUTION IMAGE

(75) Inventors: Zhengyou Zhang, Redmond, WA (US); Li-wei He, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/010,150

(22) Filed: Dec. 11, 2004

(65) Prior Publication Data

US 2005/0104902 A1 May 19, 2005

Related U.S. Application Data

(63) Continuation of application No. 10/404,745, filed on Mar. 31, 2003, now Pat. No. 7,119,816.

(51) Int. Cl.
*G09G 5/00* (2006.01)

(52) U.S. Cl. ............... 345/634; 382/294; 348/218.1

(58) Field of Classification Search ............ 345/629, 345/634, 635; 382/284, 294; 348/218.1
See application file for complete search history.

(56) References Cited

U.S. PATENT DOCUMENTS 5,528,290 A * 6/1996 Saund .................. 348/218.1
5,986,668 A * 11/1999 Szeliski et al. ............. 345/634
6,078,701 A * 6/2000 Hsu et al. .................... 382/294
6,184,781 B1 * 2/2001 Ramakesavan ............. 340/435
6,249,616 B1 * 6/2001 Hashimoto .................. 382/284
6,535,650 B1 * 3/2003 Poulo et al. ................. 382/284
6,755,537 B1 * 6/2004 Raskar et al. ................. 353/94
2003/0026588 A1 * 2/2003 Elder et al. .................. 386/46
2003/0142882 A1 * 7/2003 Beged-Dov et al. ........ 382/284
2003/0194149 A1 * 10/2003 Sobel et al. ................. 382/284
2003/0234772 A1 * 12/2003 Zhang et al. ................ 345/177
2004/0165786 A1 * 8/2004 Zhang et al. ................ 382/276

OTHER PUBLICATIONS

J. P. Lewis of Industrial Light & Magic, Fast Normalized Cross-Correlation, 1995, pp. 1-7.*
Christoph Fehn, Eddie Cooke, O. Schreer, Peter Kauff, Heinrich-Hertz-Institut, Einsteinufer, Corresponding Author: Christoph Fehn, 3D Analysis and Image-Based Rendering for Immersive TV Application, 2002, SPIC2002, pp. 1-28.*

(Continued)

*Primary Examiner*—Jeffery A Brier
(74) *Attorney, Agent, or Firm*—Lyon & Harr, LLP; Katrina A. Lyon

(57) ABSTRACT

This invention is directed toward a system and method for scanning a scene or object such as a whiteboard, paper document or similar item. More specifically, the invention is directed toward a system and method for obtaining a high-resolution image of a whiteboard or other object with a low-resolution camera. The system and method of the invention captures either a set of snapshots with overlap or a continuous video sequence, and then stitches them automatically into a single high-resolution image. The stitched image can finally be exported to other image processing systems and methods for further enhancement.

20 Claims, 13 Drawing Sheets

OTHER PUBLICATIONS

Harpreet S Sawhney, Steve Hsu, and R Kumar, To appear in the Proc of the European Conf on Computer Vision titled Robust Video Mosaicing through Topology Inference and Local to Global Alignment, 1998, 16 pages.*

Sawhney, H.S.; Guo, Y.; Asmuth, J.; Kumar, R.; Multi-view 3D estimation and applications to match move; Jun. 26, 1999; Multi-View Modeling and Analysis of Visual Scenes, 1999. (MVIEW '99) Proceedings. IEEE Workshop on; pp. 21-28.*

* cited by examiner

SYSTEM AND METHOD FOR WHITEBOARD SCANNING TO OBTAIN A HIGH RESOLUTION IMAGE

CROSS-REFERENCE TO RELATED APPLICATIONS

This application is a continuation of a prior application entitled "A SYSTEM AND METHOD FOR WHITEBOARD STREAMING TO OBTAIN A HIGH RESOLUTION IMAGE" which was assigned Ser. No. 10/404,745 and filed Mar. 31, 2003, now U.S. Pat. No. 7,119,816.

BACKGROUND

1. Technical Field

This invention is directed toward a system and method for obtaining a high-resolution image of a whiteboard or other object. More specifically, this invention is directed toward a system and method for obtaining a high-resolution image of a whiteboard or similar object with a low-resolution camera.

2. Background Art

The many advances in technology have revolutionized the way meetings are conducted. For instance, many knowledge workers attend meetings with their notebook computers. Additionally, many meetings nowadays are distributed—that is, the meeting participants are not physically co-located and meet via video-conferencing equipment or via a network with images of the meeting participants taken by a web camera (web cam) and transferred over the network.

One fairly common device used in meetings is the conventional whiteboard that is written on during a meeting by the meeting participants. Alternately, an easel with a white paper pad is also used. Many meeting scenarios use a whiteboard extensively for brainstorming sessions, lectures, project planning meetings, patent disclosures, and so on. Note-taking and copying what is written on the board or paper often interferes with many participants' active contribution and involvement during these meetings. As a result, efforts have been undertaken to capture this written content in some automated fashion. One such method is via capturing an image of the written content. There are, however, issues with this approach to capturing the content of a whiteboard or paper document.

Although a typical lap top computer is sometimes equipped with a built-in camera, it is normally not possible to copy images of annotations of a fruitful brainstorming session on a whiteboard because the typical built-in laptop camera has a maximum resolution 640×480 pixels that is not high enough to produce a readable image of the whiteboard.

Likewise, in the distributed meeting scenario where a meeting participant has a document only in paper form to share with other remote meeting participants, a web cam, which typically has a maximum resolution of 640×480 pixels, is unable to produce a readable image of the paper document to provide to the other participants.

Hence, the current technology is lacking in capturing whiteboard or other document data for the above-mentioned scenarios, and many other similar types of situations.

SUMMARY

The invention is directed toward a system and method that produces a high-resolution image of a whiteboard, paper document or similar planar object with a low-resolution camera by scanning the object to obtain multiple images and then stitching these multiple images together. By zooming in (or approaching to the whiteboard physically) and taking smaller portions of the object in question at a given resolution, a higher resolution image of the object can be obtained when the lower-resolution images are stitched together.

The planar object image enhancing system and method for creating a high-resolution image from low-resolution images can run in two modes: snapshot or continuous. Although the image acquisition procedure differs for the two operation modes, the stitching process is essentially the same.

In snapshot mode, one starts by acquiring a snapshot from the upper left corner of the object such as a whiteboard, a second by pointing to the right but having overlap with previous snapshot, and so on until reaching the upper right corner; moving the camera lower and taking a snapshot, then taking another one by pointing to the left, and so on until reaching the left edge. The process continues in this horizontally flipped S-shaped pattern until the lower border is captured. Successive snapshots must have overlap to allow later stitching, and this is assisted by providing visual feedback during acquisition.

In continuous mode, the user takes images also starting from the upper left corner but in this case continuously following the same S-shaped pattern discussed above without stopping to capture an image. The difference from the snapshot mode is that the user does not need to wait and position the camera anymore before taking a snapshot. The continuous image acquisition also guarantees overlap between successive images assuming a sufficient capture rate. However, motion blur may cause the final stitched image look not as crisp as those obtained with snapshot mode. In order to reduce the blur, the camera exposure time should be set to a small value.

Of course, other acquisition patterns besides the above-mentioned ones can also be used. For example, one can start from the upper left corner, from the lower left corner, or from the lower right corner of the whiteboard or other planar object when capturing the overlapping images.

The mathematic foundation behind the invention is that two images of a planar object, regardless the angle and position of the camera, are related by a plane perspectivity, represented by a 3×3 matrix called homography H. The homography defines the relationship between the points of one image and points in a subsequent image. This relationship is later used to stitch the images together into a larger scene. It typically is a simple linear projective transformation. At least 4 pairs of point matches are needed in order to determine homography H.

Given this, the stitching process involves first, for each image acquired, extracting points of interest. In one embodiment of the image enhancement system and method of the invention, a Plessey corner detector, a well-known technique in computer vision, is used to extract these points of interest. It locates corners corresponding to high curvature points in the intensity surface if one views an image as a 3D surface with the third dimension being the intensity. However, other conventional methods of detecting the points of interest could also be used. These include, for example, a Moravec interest detector.

Next, an attempt is made to match the extracted points with those from a previous image. For each point in the previous image, a 15×15 pixel window is chosen (although another sized window could be chosen) centered on the point under consideration, and the window is compared with windows of the same size, centered on the points in the current image. A zero-mean normalized cross correlation between two windows is computed. If the intensity values of the pixels in each window are rearranged as a vector, the correlation score is equivalent to the cosine angle between the two intensity vectors. The correlation score ranges from −1, for two windows that are not similar at all, to 1, for two windows which are identical. If the largest correlation score exceeds a prefixed threshold (0.707 in one working embodiment of the invention), then the associated point in the current image is considered to be the match candidate to the point in the previous image under consideration. The match candidate is retained as a match if and only if its match candidate in the previous image happens to be the point being considered. This symmetric test reduces many potential matching errors.

The set of matches established by correlation usually contains false matches because correlation is only a heuristic and only uses local information. Inaccurate location of extracted points because of intensity variation or lack of strong texture features is another source of error. The geometric constraint between two images is the homography constraint. If two points are correctly matched, they must satisfy this constraint, which is unknown in this case. If the homography between the two images is estimated based on a least-squares criterion, the result could be completely wrong even if there is only one false match. This is because least-squares is not robust to outliers (erroneous data). A technique based on a robust estimation technique known as the least median squares was developed to detect both false matches and poorly located corners, and simultaneously estimate the homography matrix H.

The aforementioned optimization is performed by searching through a random sampling in the parameter space to find the parameters yielding the smallest value for the median of squared residuals computed for the entire data set. From the smallest median residual, one can compute a so-called robust standard deviation $\hat{\sigma}$, and any point match yielding a residual larger than, say, $2.5\hat{\sigma}$ is considered to be an outlier and is discarded. Consequently, it is able to detect false matches as many as 49.9% of the whole set of matches.

This incremental matching procedure of the stitching process stops when all images have been processed.

Because of the incremental nature, cumulative errors are unavoidable. For higher accuracy, one needs to adjust H's through global optimization by considering all the images simultaneously. Take an example of a point that is matched across three views. In the incremental case, they are considered as two independent pairs, the same way as if they were projections of two distinct points in space. In the global optimization, the three image points are treated exactly as the projections of a single point in space, thus providing a stronger constraint in estimating the homographies. Therefore, the estimated homographies are more accurate and more consistent.

Once the geometric relationship between images (in terms of homography matrices H's) are determined, all of the images can be stitched together as a single high-resolution image. There are several options, and in one working embodiment of the invention a very simple one was implemented. In this embodiment, the first image is used as the reference frame of the final high-resolution image, and original images are successively matched to the reference frame. If a pixel in the reference frame appears several times in the original images, then the one in the newest image is retained.

The image enhancing system and method according to the invention has many advantages. For instance, the invention can produce a high-resolution image from a low-resolution set of images. Hence, only a low-resolution camera is necessary to create such a high-resolution image. This results in substantial cost savings. Furthermore, high-resolution images can be obtained with typical equipment available and used in a meeting. No specialized equipment is necessary.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
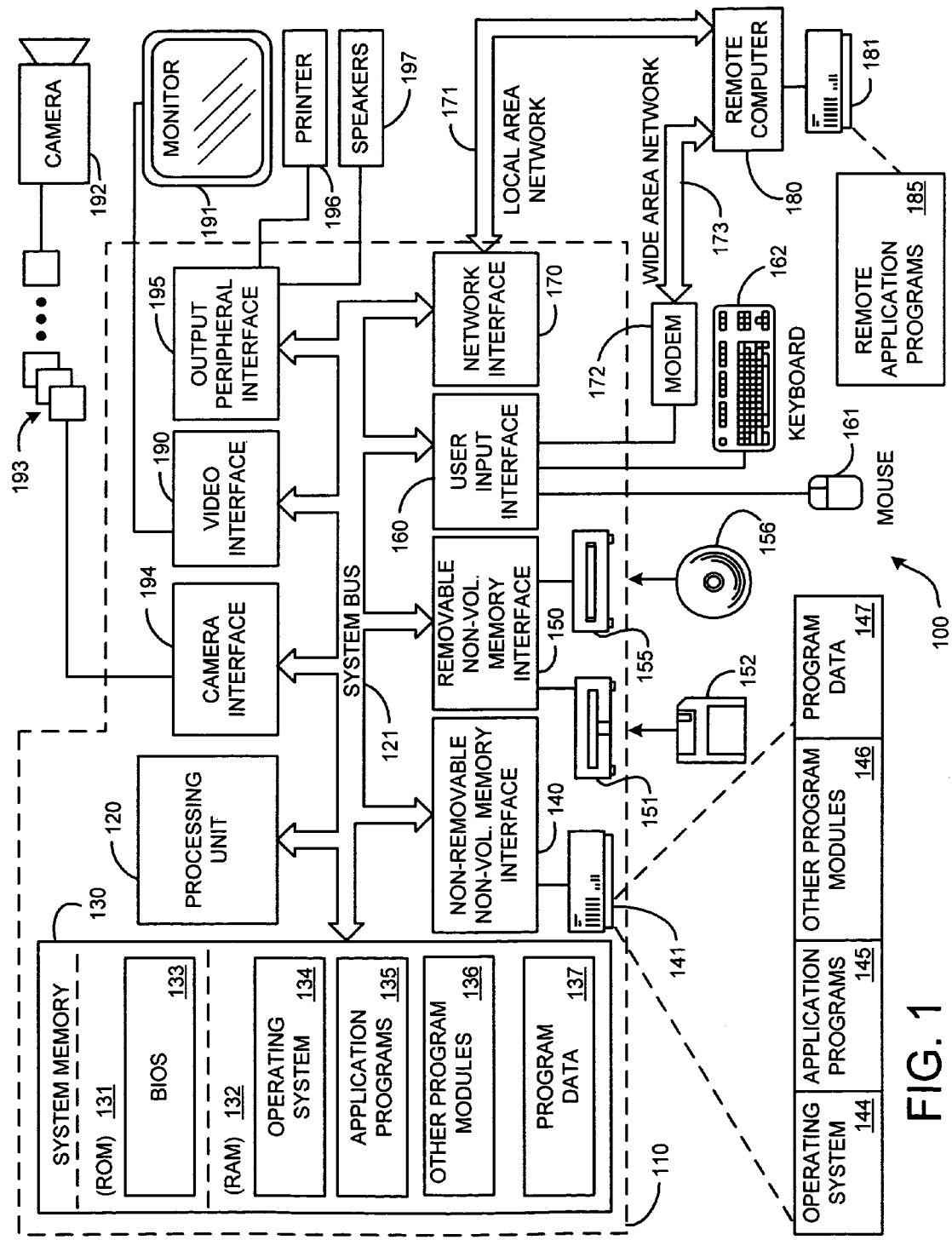
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available physical media that can be accessed by computer 110 and includes both volatile and nonvolatile media, removable and non-removable media. By way of example, and not limitation, computer readable media may comprise physical computer storage media. Computer storage media includes volatile and nonvolatile removable and non-removable media implemented in any physical method or technology for storage of information such as computer readable instructions, data structures, program modules or other data. Computer storage media includes physical devices such as, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161 commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routes to arid stored, in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 System and Method for Whiteboard Scanning to Obtain a High Resolution Image.

The invention is directed toward a system and method of converting the content of a regular whiteboard, paper document or similar planar object into a single high-resolution image that is composed of stitched together lower-resolution images.

2.1 General Overview.

Figure 2:
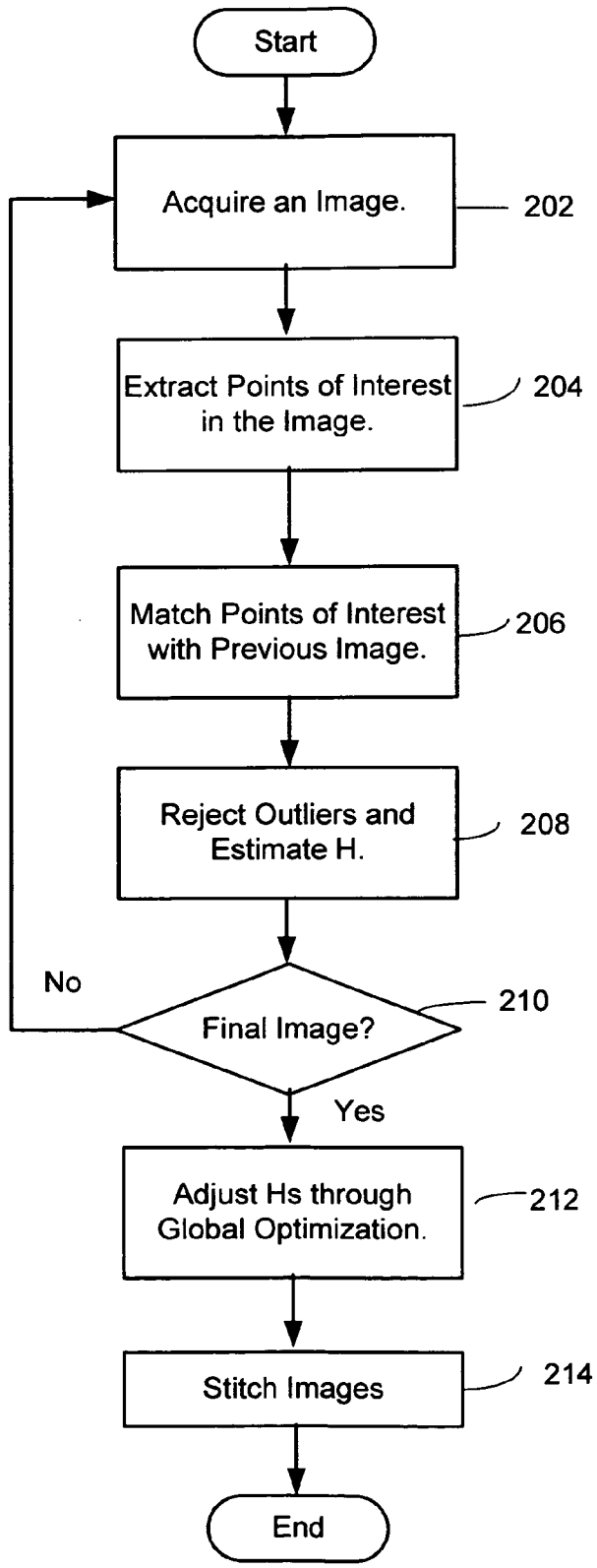
FIG. 2 is a general flow diagram of the planar object image enhancing system and method for creating a high-resolution image from low-resolution images.

A general flow chart of the system and method according to the invention is shown in FIG. 2. The system begins by acquiring images of portions of a whiteboard, paper document or other subject of interest in a prescribed overlapping pattern, with a still or video camera, as shown in process action 202. The acquired images are represented in a digital form, consisting of an array of pixels. Once an image has been obtained, the points of interest are extracted from this image (process action 204). The points of interest extracted in process action 204 are matched with the previous image of the subject, as shown in process action 206. Outlying points of interest are rejected, and a homography H is estimated (process action 208). This continues for each image in turn until the final image captured is reached (process action 210), at which time the homographies may be adjusted through global optimization (process action 212). The acquired images are then stitched together (process action 214) to create a high-resolution composite image of the item of interest.

The general system and method according to the invention having been described, the next paragraphs provide details of the aforementioned process actions.

2.2 Image Acquisition

Figure 3:
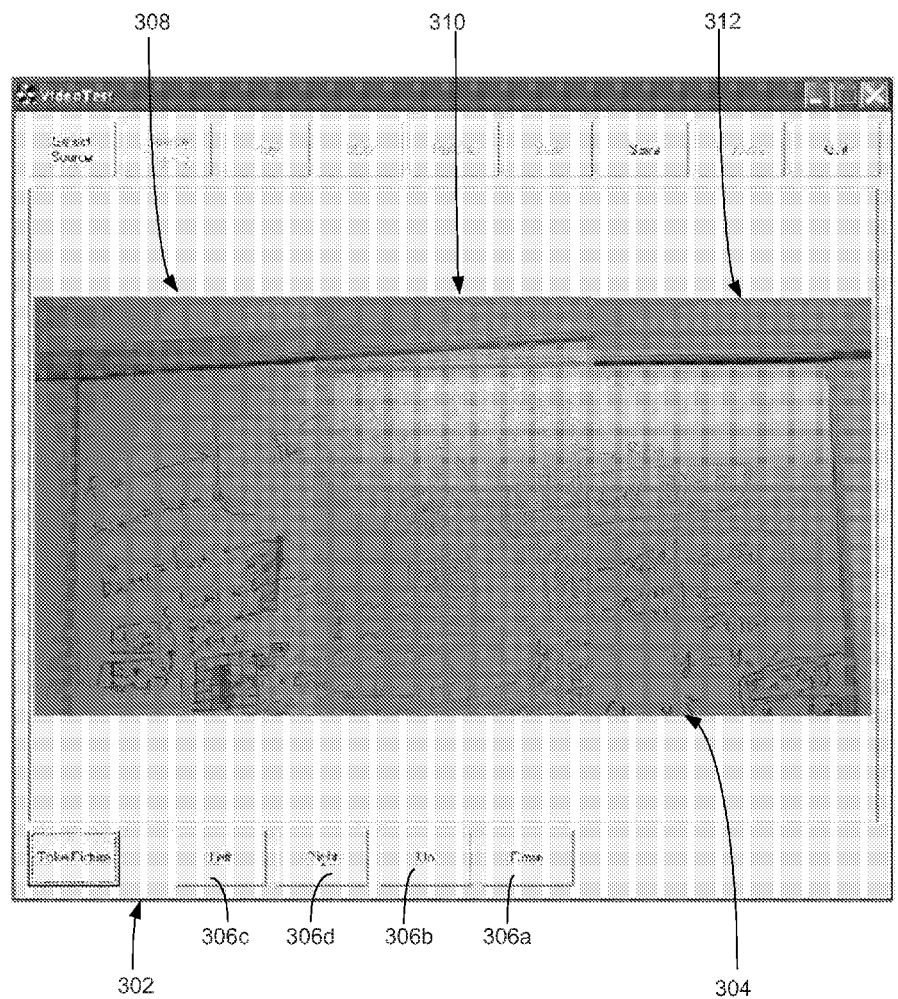
FIG. 3 is an exemplary user interface employed in one working embodiment of the system and method according to the invention.
Figure 4A:
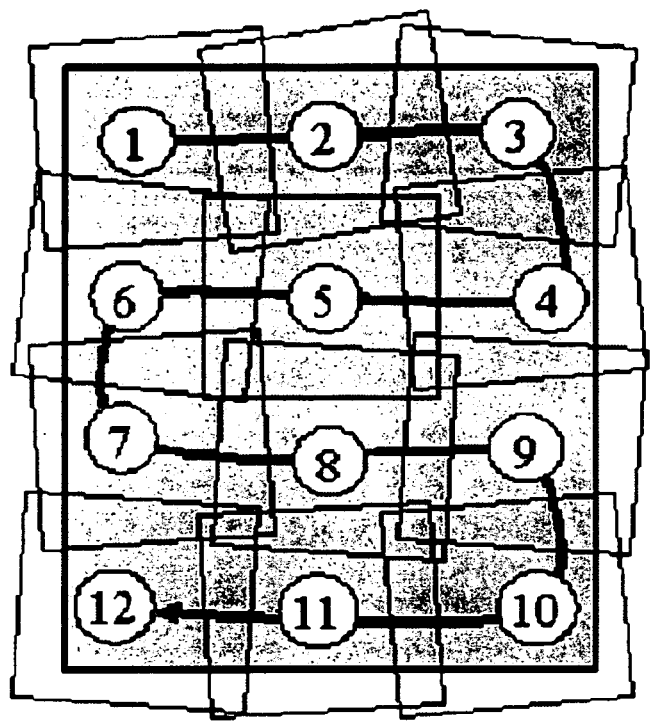
FIG. 4A is an illustration of the snapshot image acquisition mode of the image enhancing system and method according to the invention.

The system can acquire images in two modes: snapshot or continuous. Although the image acquisition procedure differs for the two operation modes, the stitching process is essentially the same. In snapshot mode, one starts by taking a snapshot from the upper left corner, a second by pointing to the right but having overlap with previous snapshot, and so on until reaching the upper right corner; moving the camera lower and taking a snapshot, then taking another one by pointing to the left, and so on until reaching the left edge. The process continues in this horizontally flipped S-shaped pattern until the lower border is captured. Successive snapshots must have overlap to allow later stitching, and this is assisted by providing visual feedback during acquisition. In one working embodiment of the system and method according to the invention, an image overlap of approximately 50% is suggested, but the system works with much less overlap in sacrificing the accuracy of the stitching quality, e.g., 5 to 20%. FIG. 3 depicts a user interface 302 of one working embodiment of the invention. In the viewing region 304, both the previously acquired image and the current image or video is displayed. In order to facilitate the image acquisition, approximately half of the previously acquired image 308 is shown as opaque, while the other half, which is in the overlapping region 310, is shown as semi-transparent. The current live video is also shown as half opaque and half semi-transparent. This guides the user to take successive images with overlap. Note that the alignment does not need to be precise. The system and method according to the invention will align them. There are also a few buttons 306*a*, 306*b*, 306*c*, 306*d* to indicate the direction in which the user wants to move the camera (down, up, left, right). The overlapping regions change depending on the direction. In one embodiment of the invention, the default behavior was designed such that only the "down" button is necessary to realize image acquisition in the desired pattern FIG. 4A illustrates this image acquisition process.

Figure 4B:
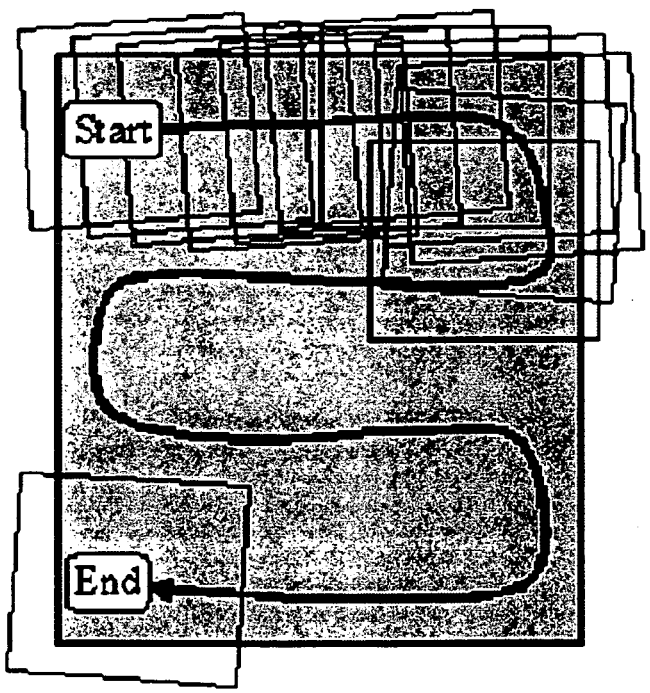
FIG. 4B is an illustration of the continuous image acquisition mode of the image enhancing system and method according to the invention.

In continuous mode, the user takes images also starting from the upper left corner but in this case continuously following the S-shaped pattern without stopping to capture a specific image as illustrated in FIG. 4B. The difference from the snapshot mode is that the user does not need to wait and position the camera before taking a snapshot. The continuous image acquisition also guarantees overlap between successive images. However, motion blur may cause the final stitched image look not as crisp as those obtained with snapshot mode. In order to reduce the blur, the camera exposure time should be set to a small value.

It should be noted that the pattern of acquisition for either the snap shot or continuous mode could be performed in other prescribed patterns as long as there is an overlap between successive images. For example, the pattern could start at the right upper corner and move to the left and downward. Or, similarly, the pattern could start at the lower right corner and move to the left and upwards.

The stitching process works very much in a similar way in both image acquisition operation modes, and is illustrated in FIG. 2.

2.3 Extracting Points of Interest

Figure 5:
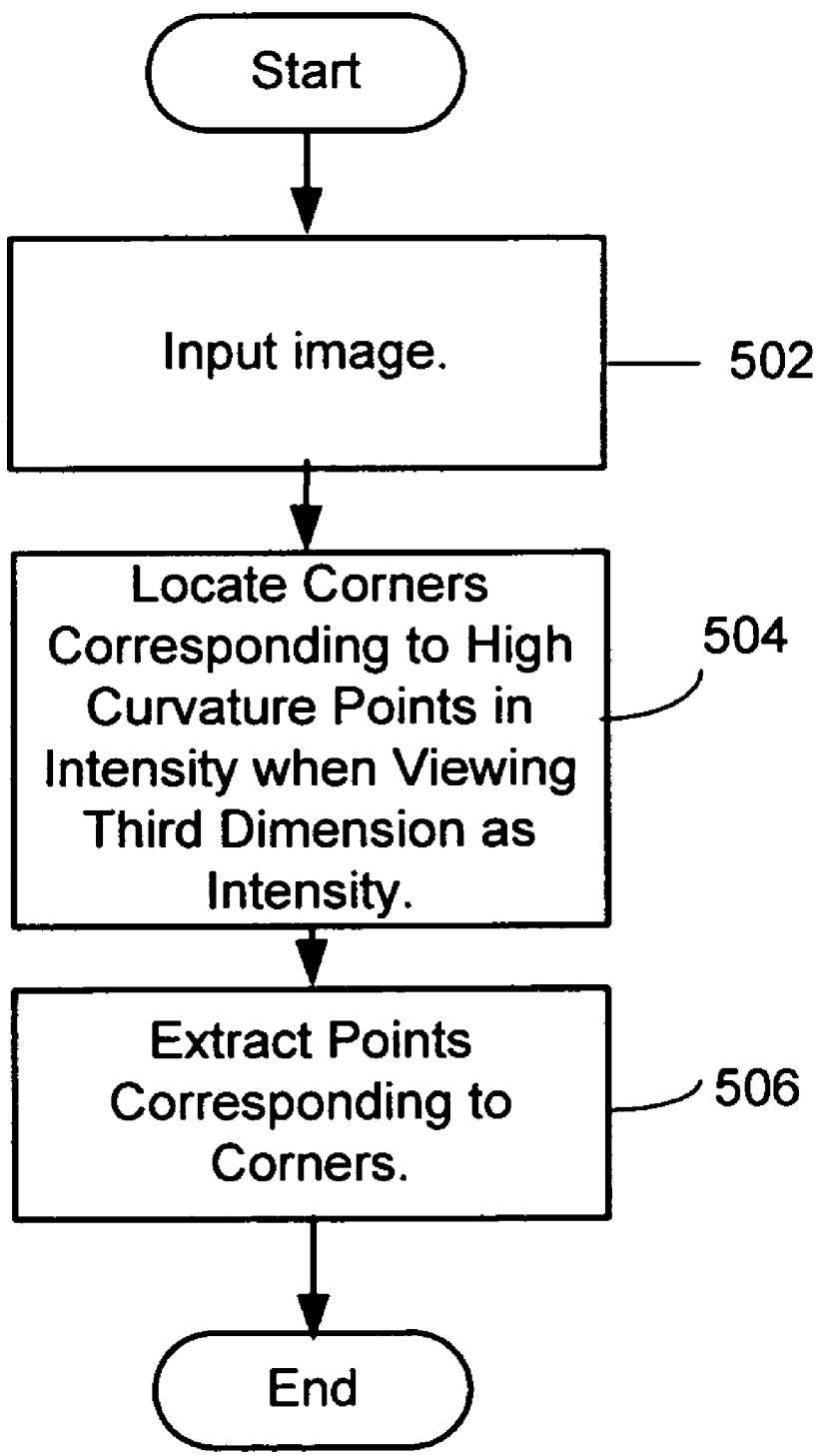
FIG. 5 is a flow diagram depicting the process of extracting points of interest in the image enhancing system and method according to the invention.
Figure 6:
FIG. 6 is an image showing an example of extracted points of interest, indicated by a + of the image enhancing system and method according to the invention.

Referring to FIGS. 2 and 5, for each image acquired, points of interest are extracted. A Plessey corner detector, which is a well-known technique in computer vision, is used in one embodiment of the image enhancement system and method of the invention. As shown in FIG. 5, process action 502, an image is input. The Plessey corner detector locates corners corresponding to high curvature points in the intensity surface if one views an image as a 3D surface with the third dimension being the intensity (process action 504). As shown in process action 506, these points corresponding to the corners are extracted as the points of interest. An example is shown in FIG. 6, where the extracted points are displayed in red+.

2.4 Matching Points of Interest

Figure 7:
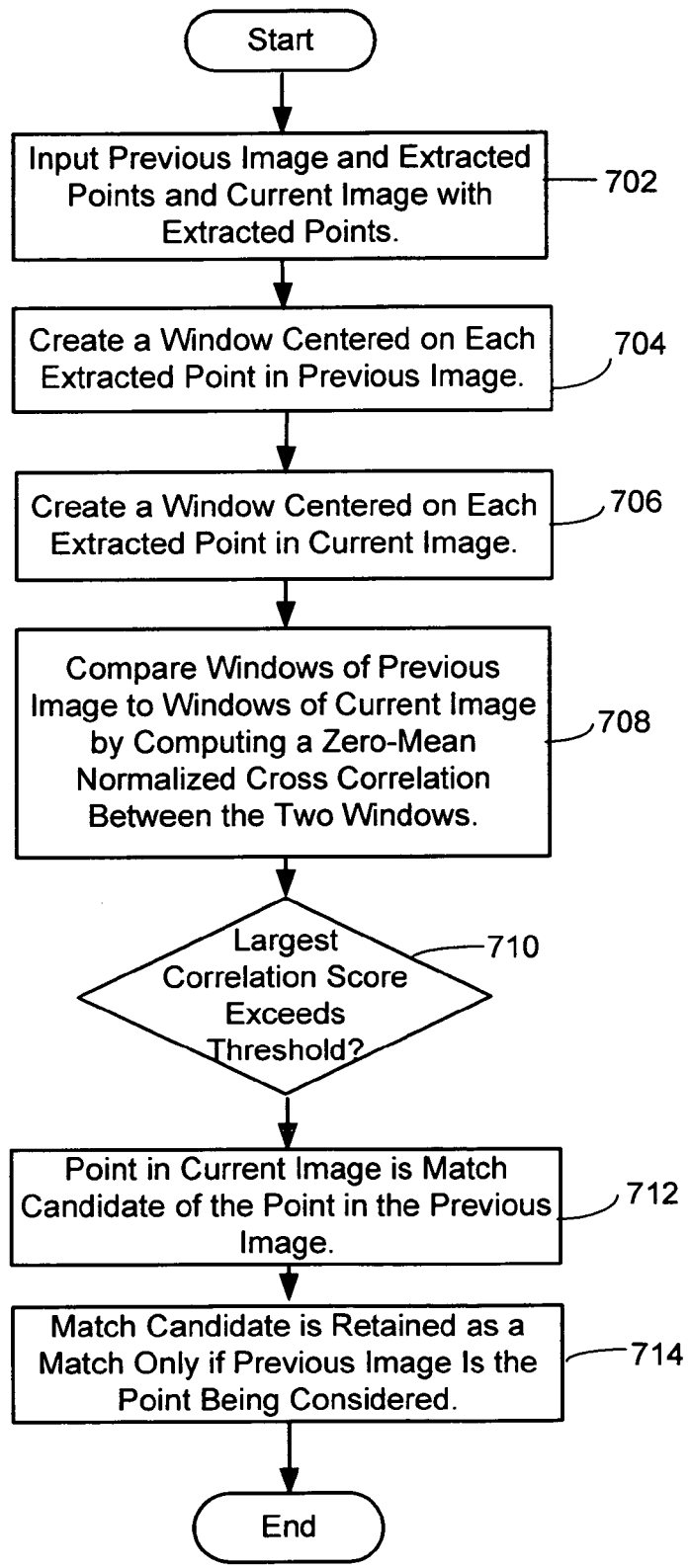
FIG. 7 is a flow diagram depicting the process of matching the points of interest between images in the image enhancing system and method according to the invention.

Next, as shown in FIG. 7, an attempt is made to match the extracted points with those from the previous image as is shown in process action 702. For each point in the previous image, a 15×15 pixel window is chosen (although a different sized window could be chosen) centered on the point under consideration, and the window is compared with windows of the same size, centered on the points in the current image (process actions 704 through 708). A zero-mean normalized cross correlation between two windows is computed in order to make this comparison. If the intensity values of the pixels in each window are rearranged as a vector, the correlation score is equivalent to the cosine angle between the two intensity vectors. The correlation score ranges from −1, for two windows that are not similar at all, to 1, for two windows that are identical. As shown in process action 710, if the largest correlation score found for each point in the previous image exceeds a prefixed threshold (0.707 in one working embodiment of the invention), then the associated point in the current image is considered to be the match candidate to the point in the previous image under consideration. The match candidate is retained as a match if and only if its match candidate in the previous image happens to be the point being considered. That is, by reversing the role of the two images, an attempt is made to find the best match in the previous image for the match candidate in the current image; if the best match in the previous image is the point under consideration, this point and the match candidate are considered to be matched; otherwise, the match candidate is discarded, and there is no match for the point under consideration. This symmetric test reduces many potential matching errors.

2.5 Rejecting Outliers and Estimating the Homography.

The mathematic foundation behind the invention is that two images of a planar object, regardless of the angle and position of the camera, are related by a plane perspective, represented by a 3×3 matrix called homography H. The homography defines the relationship between the points of one image and points in another image. This relationship is later used to stitch the images together into a larger scene. More precisely, let $m_1=[u_1, v_1]^T$ and $m_2=[u_2, v_2]^T$ be a pair of corresponding points, and use the notation ~ for $\tilde{m}=[u, v,1]^T$, then $$\tilde{m}_2 = \lambda H \tilde{m}_1 \qquad (1)$$

where λ is a scalar factor. That is, H is defined up to a scalar factor. At least 4 pairs of point matches are needed in order to determine a homography H between two images.

Figure 8:
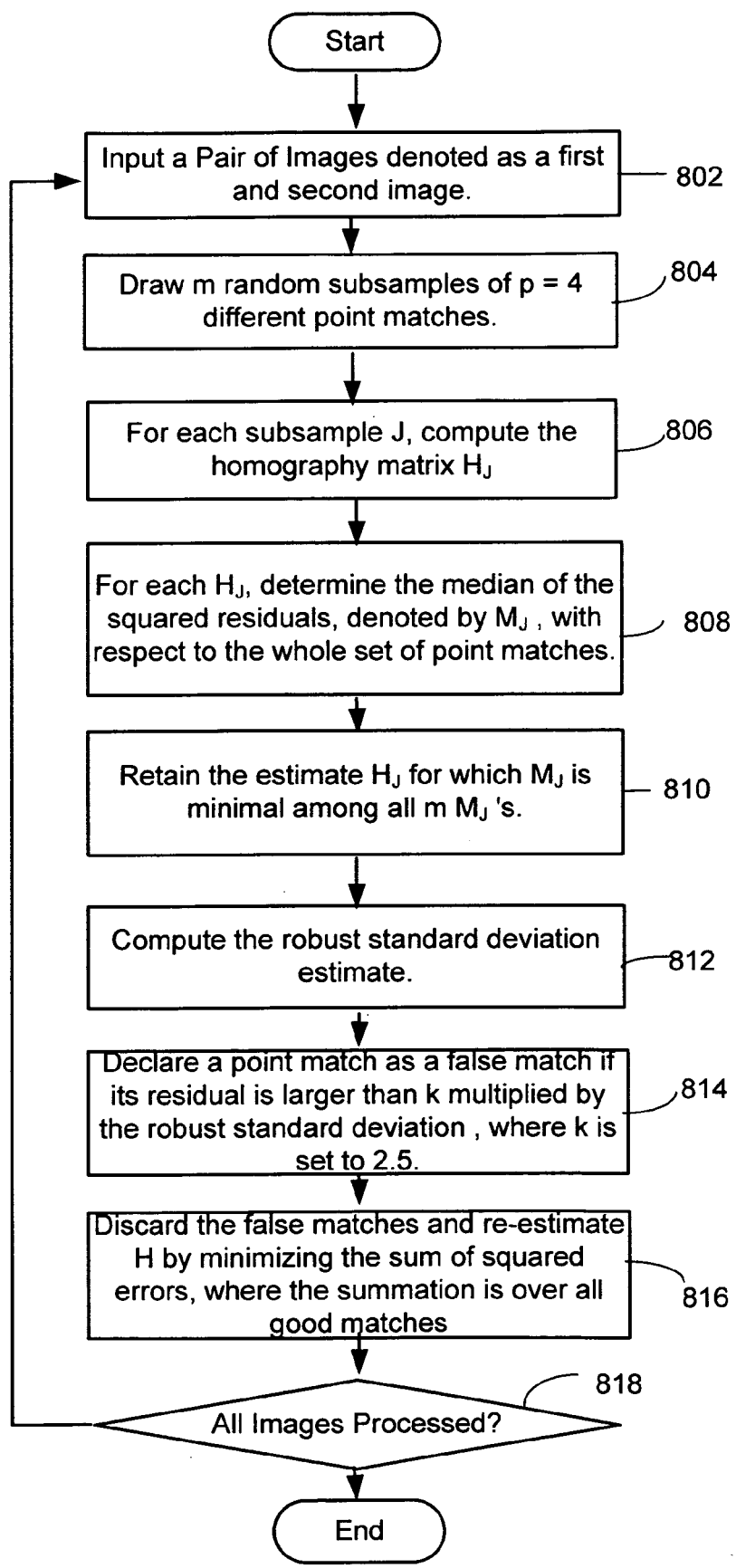
FIG. 8 is a flow diagram depicting the process of estimating the homography between two images in the image enhancing system and method according to the invention.

The set of matches established by correlation usually contains false matches because correlation is only a heuristic and only uses local information. Inaccurate location of extracted points because of intensity variation or lack of strong texture features is another source of error. The geometric constraint between two images is the homography constraint (1). If two points are correctly matched, they must satisfy this constraint, which is unknown in this case. If the homography between the two images is estimated based on a least-squares criterion, the result could be completely wrong even if there is only one false match. This is because least-squares is not robust to outliers (erroneous data). A technique based on a robust estimation technique known as the least median squares was developed to detect both false matches and poorly located corners, and simultaneously estimate the homography matrix H. More precisely, let $\{(m_{1i}, m_{2i})\}$ be the pairs of points between two images matched by correlation, the homography matrix H is estimated by solving the following nonlinear problem:

$$\min_H \operatorname{median}_i \|m_{2i} - \hat{m}_{1i}\|^2 \qquad (2)$$

where $\hat{m}_{1i}$ is the point $m_{1i}$ transferred to the current image by H, i.e., $\hat{m}_{1i} = \lambda_H \tilde{m}_{1i}$ The aforementioned optimization is performed by searching through a random sampling in the parameter space of the homography to find the parameters yielding the smallest value for the median of squared residuals computed for the entire data set. From the smallest median residual, a so-called robust standard deviation $\hat{\sigma}$ can be computed, and any point match yielding a residual larger than, say, $2.5\hat{\sigma}$ is considered to be an outlier and is discarded. Consequently, it is able to detect false matches in as many as 49.9% of the whole set of matches. More concretely, after inputting a pair of images (referred to as a first image and a second image for explanation purposes) (process action 802), this outlier rejection procedure is shown in FIG. 8 and is implemented as follows:

1. Draw m random subsamples of p=4 different point matches (process action 804). (At least 4 point matches are needed to determine a homography matrix.)
2. For each subsample J, compute the homography matrix $H_J$ according to (1) (process action 806).
3. For each $H_J$, determine the median of the squared residuals, denoted by $M_J$, with respect to the whole set of point matches. The squared residual for match i is given by $\|m_{2i}-\hat{m}_{1i}\|^2$ where $\hat{m}_{1i}$ is point $m_{1i}$ transferred to the second image by $H_J$ (process action 808).
4. Retain the estimate $H_J$ for which $M_J$ is minimal among all m $M_J$'s (process action 810).
5. Compute the robust standard deviation estimate: $\hat{\sigma}=1.4826[1+5/(n-p)]\sqrt{M_J}$, where n is twice the number of matched points (process action 812).
6. Declare a point match as a false match if its residual is larger than $k\hat{\sigma}$, where k is set to 2.5 (process action 814).
7. Discard the false matches and re-estimate H by minimizing the sum of squared errors $\Sigma_i \|m_{2i}-\hat{m}_{1i}\|^2$ where the summation is over all good matches (process action 816).

In one embodiment of the invention, m=70, was used, which gives a probability of 99% that one of the 70 subsamples is good (i.e., all four point matches in the subsample are good) even if half of the total point matches are bad. This last step improves the accuracy of the estimated homography matrix because it uses all good matches.

This incremental matching procedure stops when all images have been processed (process action 818). Because of the incremental nature, cumulative errors are unavoidable.

2.6 Adjusting the Homographies through Global Optimization

For higher accuracy, one needs to adjust H's through global optimization by considering all the images simultaneously. This is done as follows. Let one assume that one has in total N images. Without loss of generality, the first image is chosen as the reference image for the global optimization. Let the homography matrix from the reference image to image i be $H_i$, with $H_1=1$. There are M distinct points in the reference image, which are called reference points, denoted by $\hat{m}_j$. Because of the mateling process, a reference point is observed at least in two images. For example, a point in the first image can be matched to a point in the second image, which in turn is matched to a point in the third image; this happens if the first three images shares a common region. Even if a physical point in space is observed in three or more images, only one single reference point is used to represent it. One additional symbol $\phi_{ij}$, is introduced:

$\phi_{ij}=1$ if point j is observed in image i; 0 otherwise.

One can now formulate the global optimization as estimation of both homography matrices $H_i$'s and reference points $\hat{m}_j$'s by minimizing the errors between the expected positions and the observed ones in the images, i.e., $$\min_{\{H_i\},\{\hat{m}_j\}} \sum_{i=1}^{N} \sum_{j=1}^{M} \|m_{ij} - \hat{m}_{ii}\|^2, \text{ where } \tilde{m}_{ij} = \lambda_{ij} H \tilde{m}_j$$

with $\lambda_{ij}$ being a scalar factor.

2.7 Stitching Images.

Figure 9:
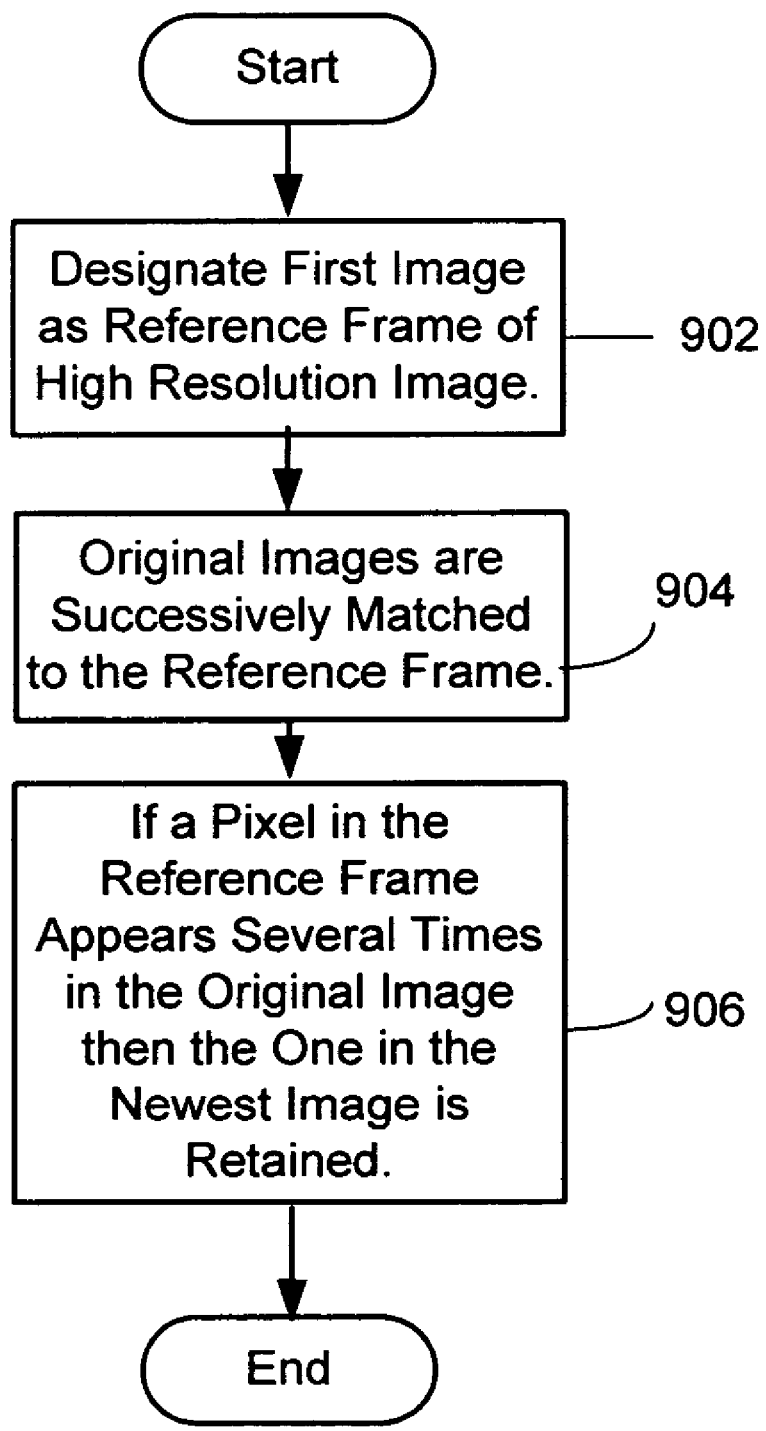
FIG. 9 is a flow diagram depicting the process of stitching together images to obtain a high-resolution image in the image enhancing system and method according to the invention.

Once the geometric relationship between images (in terms of homography matrices H's) are determined, one is able to stitch all images as a single high-resolution image. There are several options, and in one working embodiment a very simple one was implemented. As shown in FIG. 9, process action 902, the first image is used as the reference frame of the final high-resolution image, and original images are successively matched to the reference frame (process action 904). If a pixel in the reference frame appears several times in the original images, then the one in the newest image is retained, as shown in process action 906.

2.8 Alternate Method of Determining Matching Points of Interest.

Figure 10:
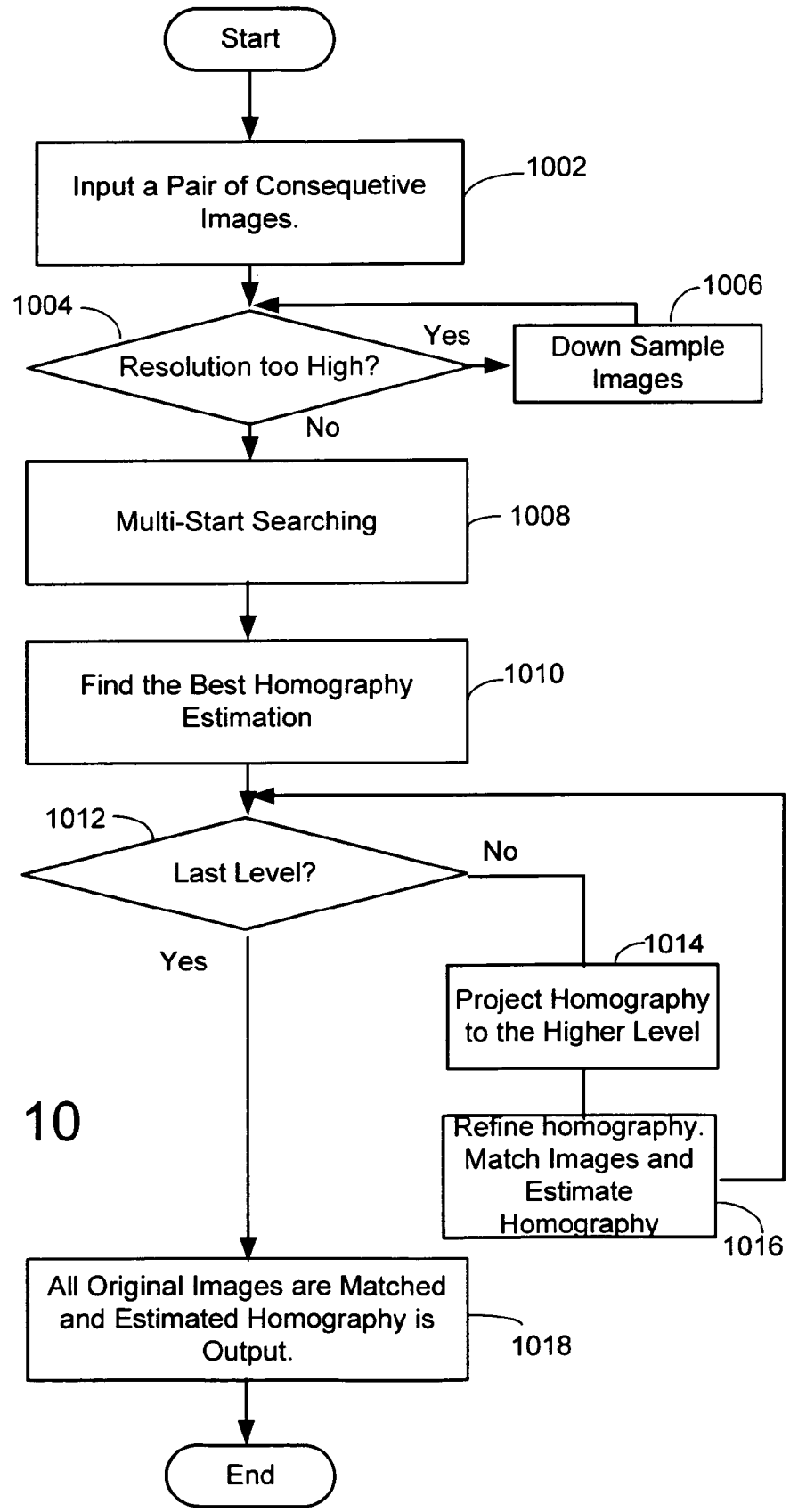
FIG. 10 is a flow diagram depicting an alternate process of matching points of interest in the system and method according to the present invention.

In order to achieve higher efficiency and robustness in matching two images without knowing any information about their relative position, a pyramidal and multi-starts search strategy was developed. The pyramidal search strategy is particularly useful when the size of the input images is very large. The flow chart of this process is shown in FIG. 10.

The process works as follows. A pair of consecutive images is input, as shown in process action 1002. A check is made as to whether the image resolution is too high (process action 1004). For example, in one embodiment of the invention, if the image width or height is bigger than 500 pixels, the image resolution is considered as too high. If the resolution is too high, then the images are down sampled (process action 1006). The image size is reduced by half in each iteration, and thus a pyramidal structure for each image is built, up to a level at which the image resolution reaches the desired one. At the lowest level (or with the original resolution if the size of input images is not too large), a multi-start search strategy is employed (process action 1008).

The multi-start search strategy as follows. For any given pixel in one image, its maximum displacement in the other image (i.e., the maximum difference between any pair of corresponding pixels, or the maximum disparity) is the image size if one assumes there is an overlap between the two images. Considering the previously described matching and homography estimation algorithm works with relatively large unknown motion, one does not need to examine every possible displacement. Instead, the displacement (which is equal to the image size) space is coarsely sampled uniformly. More concretely, the procedure is as follows.

1. Nine start points are generated, each defining the center of a search window of the previously described matching algorithm. Let W and H be the width and height of an image. The nine points are (−W/2, −H/2), (0, −H/2), (W/2, −H/2); (−W/2, 0), (0, 0), (W/2, 0); (−W/2, H/2), (0, H/2), (W/2, H/2). The size of the search window is equal to (3W/4, 3H/4), so there is an overlap between adjacent search windows in order to lower the probability of miss due to coarse sampling. Note that with this size of the search window, one does not cover the small region near the boundary, which corresponds to an overlap less than $⅛^{th}$ of the image size.

2. For each start point, the aforementioned matching and homography estimation algorithm is run, which gives the number of matched points and the root of mean square errors (RMS) of matched points, as well as an estimation of the homography between two images.

3. The homography estimation which corresponds to the largest number of matched points and the smallest RMS is chosen (process action 1010).

If the last level has not been reached (process action 1012) one then proceeds to the higher level using the previously estimated homography, which consists of two steps:

1. The homography is projected to the higher level (process action 1014). Let $H_{i-1}$ be the homography at level i−1. Since the images at level i is twice as big as the images at level i−1 in the pyramidal structure, the corresponding homography at level i, $H_i$, is equal to $S H_{i-1} S^{-1}$, where $S=\text{diag}(2,2,1)$.

2. The nomography is refined at the current level (process action 1016). There are at least two ways to do that.

Simple Technique. First, the four image corners are transformed using $H_i$, the disparity is computed for each point (i.e., the difference between the transformed corner point and the original one), and the maximum and minimum disparities are computed in both the horizontal and vertical directions. Second, the search range is defined by enlarging the difference between the maximum and minimum disparities by a certain amount (10% in one embodiment) to account for the imprecision of the estimation $H_i$. Finally, the points are matched using the search range defined earlier, and the homography is estimated based on least-median-squares.

Elaborate Technique. First, the first image and all the detected corners are transformed using $H_i$. Second, the corners are matched and the homography between the transformed image and the second image is estimated. This estimated homography is denoted by $\Delta H_i$. The search range could be quite small (say, 15 pixels) to consider the imprecision of $H_i$ estimated at a lower level. Finally, the refined homography is given by $\Delta H_i H_i$.

The above process is repeated until the original images are matched, and the estimated homography is reported as the output (process action 1018).

3.0 Exemplary Working Embodiment

The following paragraphs describe an exemplary working embodiment of the system and method of converting the content of a whiteboard, paper, or similar object into a high-resolution image.

Figure 11:
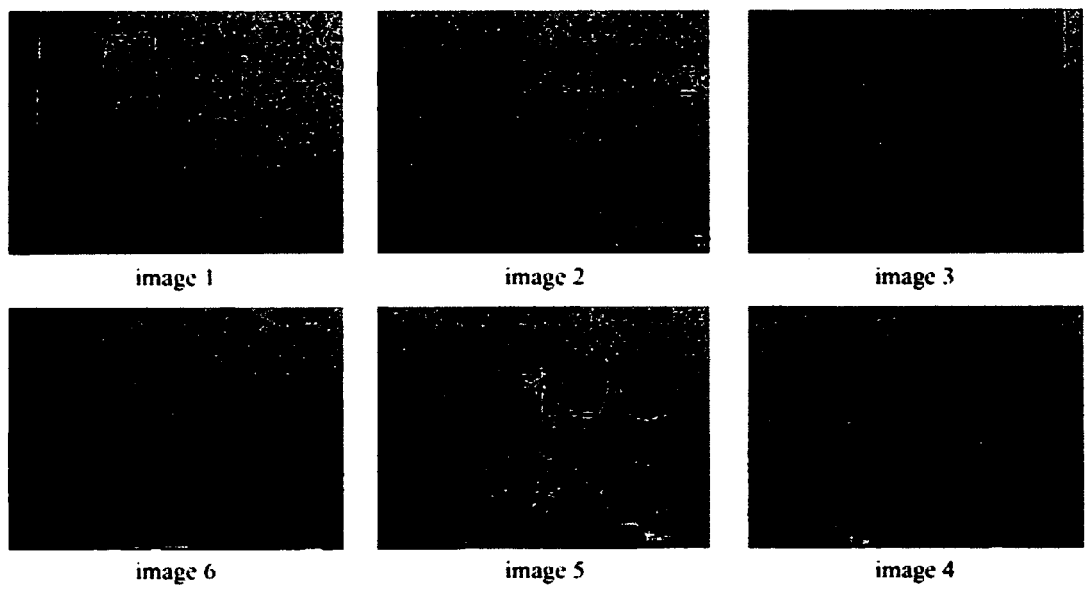
FIG. 11 is a series of images of portions of a whiteboard in an office.
Figure 12:
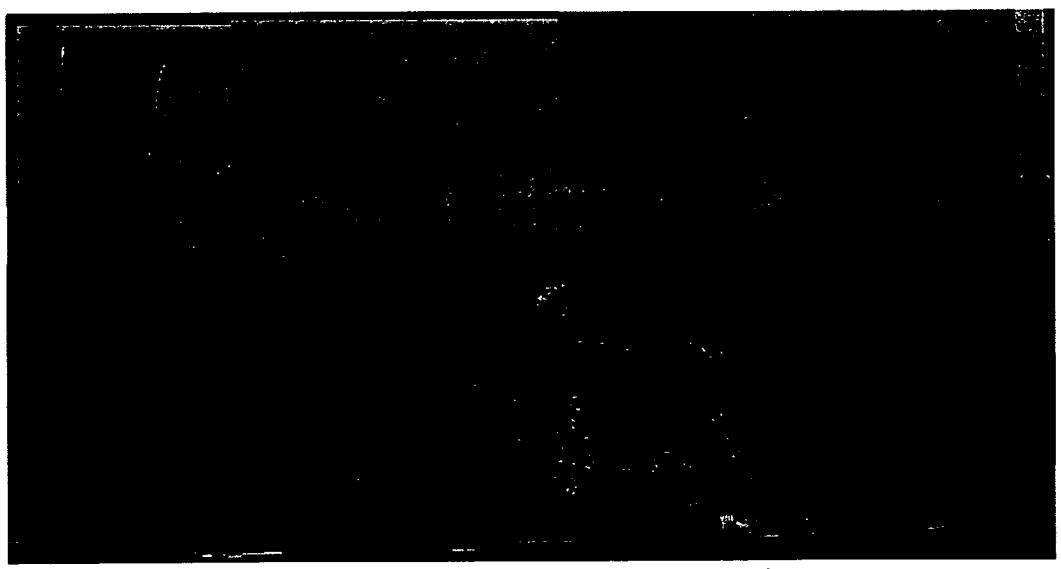
FIG. 12 is a stitched image from the series of images shown in FIG. 11 determined by the image enhancing system and method according to the invention. The cumulative error is visible at the left border.
Figure 13:
FIG. 13 shows three images of a paper document.
Figure 14A:
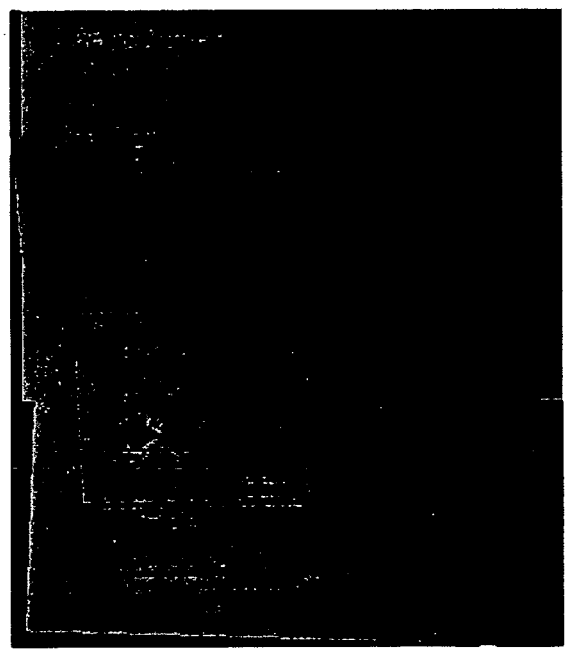
FIGS. 14A and 14B show a comparison of the stitched image from those shown if FIG. 13 provided by one working embodiment of the invention (FIG. 14A) and the same document captured by the same camera as a single image (FIG. 14B).
Figure 14B:
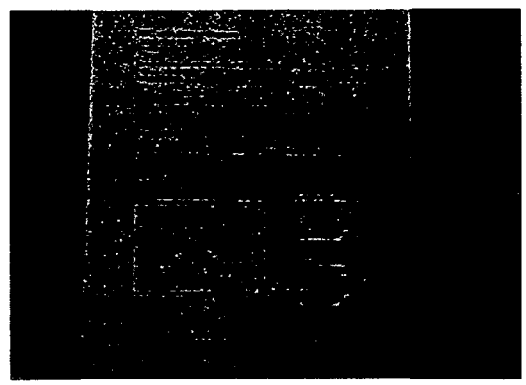

In this section, a few examples are shown. FIGS. 11 and 12 show the stitching result of six images of a whiteboard. FIGS. 13 and 14 show the stitching result of a paper document. The stitched paper document, shown in FIG. 14A, is compared in FIG. 14B with a single image of the document, and clearly the stitched image gives a much higher readability.

What is claimed is:

1. A computer-implemented process for converting the contents of a planar object into a high-resolution image, comprising the process actions of:
    acquiring a sequence of images of portions of a planar object which have been captured in a prescribed pattern and wherein each subsequent image overlaps a previous image in said pattern;
    extracting points of interest in each image;
    matching said points of said interest between each pair of successive images thereby creating a set of point matches;
    computing a projective mapping between each pair of successive images using a least median squares technique which detects both false point matches and simultaneously estimates a homography matrix in order to determine corresponding pixel locations in the images, wherein said computing a projective mapping comprises,
    (a) inputting a first image and a second image;
    (b) drawing m random subsamples of a specified number of at least four different point matches of said set of point matches;
    (c) for each subsample J, computing a homograph matrix $H_j$;
    (d) for each $H_j$, determining the median of the squared residuals, denoted by $M_j$, with respect to the whole set of point matches, where the squared residual for match i is given by $\|m_{2i}-\hat{m}_{1i}\|^2$ where $\hat{m}_{1i}$ is point $m_{1i}$ transferred to the second image by $H_j$;
    (e) retaining the estimate $H_j$ for which $M_j$ is minimal among all m $M_j$'s;
    (f) computing a robust standard deviation estimate $\hat{\sigma}$;
    (g) declaring a point match as a false match if its residual is larger than k $\hat{\sigma}$, where k is set to a prescribed value;
    (h) discarding the false matches and re-estimating H by minimizing the sum of squared errors $$\sum_i \|m_{2i}-\hat{m}_{1i}\|^2$$

where the summation is over all good matches; and
    (i) repeating process actions (a) through (h) until all images of the sequence of images have been processed; and
    generating a composite image from said sequence of images using said projective mapping.

2. The computer-implemented process of claim 1 further comprising the process action of refining the homographies computed for the pairs of successive images through global optimization.

3. The computer-implemented process of claim 1 wherein the process action of acquiring an ordered sequence of images, comprises the process actions of:
    capturing a first row of images by,
        taking a first snapshot of the upper left corner of the planar object;
        taking a second snapshot by pointing to the right of said first snapshot but having overlap with first snapshot;
        taking a subsequent snapshot by pointing to the right of the previous snapshot but having an overlap with said previous snapshot;
        continuing to take subsequent snapshots with overlap by pointing to the right of the previous snapshot until reaching the upper right corner of the planar object;
    capturing a second row of images by,
        moving the camera lower and taking with overlap a snapshot below the snapshot in the upper right corner;
        taking another snapshot by pointing with overlap to the left of said snapshot below the snapshot in the upper right corner,
        continuing to take subsequent snapshots by pointing with overlap to the left of the previous snapshot until reaching the left edge of the planar object;
        continuing capturing snapshots in the manner of capturing the first and second rows starting with the portion of the planar object under but overlapping the portion of the planar object last captured until the entire lower border of the planar object is captured.

4. The computer-implemented process of claim 1 wherein the process action of acquiring an ordered sequence of images, comprises the process actions of:
    capturing a first row of images by initially focusing the camera on an upper left corner of the planar object and continually capturing images while moving the camera in a left to right motion that ensures the overlap between successive images until the last capture image comprises the upper right corner of the planar object,
    capturing a second row of images by moving the optical axis of the camera lower and focusing below but overlapping the portion captured in the last captured image and continuously capturing images while moving the camera in a right to left direction at a speed that ensures the overlap between successive images until the last capture image comprises the left edge of the planar object,
    continuing capturing images in the manner of capturing the first and second rows starting with the portion of the planar object under but overlapping the last captured portion of the planar object until the entire last portion of the planar object is captured.

5. The computer-implemented process of claim 1 wherein extracting points of interest in each image comprises the process actions of:
 defining the image under consideration as a three dimensional surface, having two displacement dimensions with a third dimension being the intensity
 locating high curvature points in the intensity surface; and
 designating said points corresponding to the high curvature points as the points of interest.

6. The computer-implemented process of claim 1 wherein said process action of generating a composite image comprises the process actions of:
 using the first captured image as the reference frame of the final composite image;
 successively registering said images in the order in which they were captured with the immediately previously captured image to said reference frame using the projective mapping computed between the pair of images under consideration; and
 if a pixel in the reference frame appears several times in the original images, then retaining the pixel in the newest image.

7. The computer-implemented process of claim 1 for converting the contents of a planar object into a high-resolution image, wherein said planar object is a whiteboard.

8. The computer-implemented process of claim 1 for converting the contents of a planar object into a high-resolution image, wherein said planar object is a piece of paper.

9. A system for converting markings on a planar object into a high resolution image, the system comprising:
 a general purpose computing device; and
 a computer program comprising program modules executable by the computing device, wherein the corrupting device is directed by the program modules of the computer program to,
 acquire a sequence of images of portions of a planar object having been captured in a prescribed pattern, each subsequent image overlapping a previous image in said pattern;
 extract points of interest in each image in said sequence;
 match said points of said interest between two successive images in said sequence thereby creating a set of point matches;
 compute a projective mapping between each set of two successive images in said sequence of images using a east median squares technique which detects both false point matches and simultaneously estimates a homography matrix in order to determine corresponding pixel locations in the images of each set, therein said computing a projective mapping comprises,
 (a) inputting a first image and a second image;
 (b) drawing m random subsamples of a specified number of at least four different point matches of said set of point matches;
 (c) for each subsample J, computing a homography matrix $H_J$;
 (d) for each $H_J$, determining the median of th squared residuals, denoted by $M_J$, with respect to the whole set of point matches, where the squared residual for match j is given by $\|m_{2i}-\hat{m}_{1i}\|^2$ where $\hat{m}_{1i}$ is point $m_{1i}$ transferred to the second image by $H_J$;
 (e) retaining the estimate $H_J$ for which $M_J$ is minimal among all m $M_J$'s;
 (f) computing a robust standard deviation estimated $\hat{\sigma}$;
 (g) declaring a point match as a false match if its residual is larger than k $\hat{\sigma}$, where k is set to a prescribed value;
 (h) discarding the false matches and re-estimating H by minimizing the sum of squared errors $$\sum_i \|m_{2i} - \hat{m}_{1i}\|^2$$

where the summation is over all good matches; and
 (i) repeating process actions (a) through (h) until all images of the sequence of images have been processed; and
 generate a composite image from said images using said projective mapping.

10. The system of claim 9 further comprising a module for adjusting all of the homographies computed for said sets of two successive images through global optimization.

11. The system of claim 9 wherein the module for extracting points of interest in each image in the sequence comprises sub-modules for:
 inputting an image;
 locating corners corresponding to high curvature points in the intensity surface if defining said image as a three dimensional surface, defined by two displacement dimensions and a third dimension being the intensity; and
 extracting said points corresponding to the corners as the points of interest.

12. The system of claim 9 wherein said module for generating a composite image comprises modules for:
 using the first captured image as the reference frame of the final composite image;
 successively registering said images in the order in which they were captured with the immediately previously captured image to said reference frame using the projective mapping computed between the pair of images under consideration; and
 if a pixel in the reference frame appears several times in the original images, then retaining the one in the newest image.

13. A computer-readable medium having computer-executable instructions for converting a series of low resolution images of portions of a planar object into a high resolution image of said object, said computer executable instructions causing a computer to execute the method comprising:
 acquiring a series of images of the depicting portions of the same scene:
 extracting points of interest in each image of said series of images;
 matching said points of interest in each image of said series of images with the image preceding said image in said series of images thereby creating a set of point matches;
 using a least median squares technique which detects both false point matches and simultaneously estimates a homography matrix to calculate a homography between each image of said series of images with the image preceding said image in said series of images, wherein said calculating a homography comprises,
 (a) inputting a first image and a second image;
 (b) drawing m random subsamples of a specified number of at least for different point matches of said set of point matches;
 (c) for each subsample J, computing a homography matrix $H_J$;

(d) for each $H_j$, determining the median of the squared residuals, denoted by $M_j$, with respect to the whole set of point matches, where the squared residual for match i is given by $\|m_{2i}-\hat{m}_{1i}\|$ is point $m_{1i}$ transferred to the second image by $H_j$;

(e) retaining the estimate $H_J$ for which $M_J$ is minimal among all m $M_j$'s;

(f) computing a robust standard deviation estimate $\hat{\sigma}$;

(g) declaring a point match as a false match if its residual is larger than $k\hat{\sigma}$, where k is set to a prescribed value;

(h) discarding the false matches and re-estimating H by minimizing the sum of squared errors $$\sum_i \|m_{2i} - \hat{m}_{1i}\|^2$$

matches; and (i) repeating process actions (a) through (h) until all images of the sequence of images have been processed; and stitching each image in said series of images together using said homographies to create a composite image.

14. The computer-readable medium of claim 13 further comprising instructions for globally optimizing said homographies prior to stitching said images together.

15. The computer-readable medium of claim 13 wherein said instructions for extracting points of interest in each image comprises sub-instructions for:

defining the image under consideration as a three dimensional surface, having two displacement dimensions with a third dimension being the intensity locating high curvature points in the intensity surface; and designating said points corresponding to the high curvature points as the points of interest.

16. The computer-readable medium of claim 13 wherein said instruction for stitching said images together to create a composite image comprises sub-instructions for:

using the first image in said series of images as the reference frame of the final composite image;

successively matching said images in said series of images to said reference frame using said homographies to determine pixel location; and if a pixel in the reference frame appears several times in the original images, then retaining the one in the newest image.

17. The computer-readable medium of claim 13 wherein the instruction for acquiring an ordered sequence of images, comprises sub-instructions for:

capturing a first row of images by, taking a first snapshot of the lower right corner of the planar object;

taking a second snapshot by pointing to the left of said first snapshot but having overlap with first snapshot;

taking a subsequent snapshot by pointing to the left of the previous snapshot but having an overlap with said previous snapshot;

continuing to take subsequent snapshots with overlap by pointing to the left of the previous snapshot until reaching the lower left corner of the planar object;

capturing a second row of images by, moving the camera higher and taking with overlap a snapshot above the snapshot in the lower left corner;

taking another snapshot by pointing with overlap to the right of said snapshot above the snapshot in the lower left corner, continuing to take subsequent snapshots by pointing with overlap to the right of the previous snapshot until reaching the right edge of the planar object;

continuing capturing snapshots in the manner of capturing the first and second rows starting with the portion of the planar object above but overlapping the portion of the planar object last captured until the entire upper border of the planar object is captured.

18. The computer-readable medium of claim 13 wherein the instructions for acquiring an ordered sequence of images, comprises sub-instructions for:

capturing a first row of images by initially focusing the camera on an upper right corner of the planar object and continually capturing images while moving the camera in a right to left motion that ensures the overlap between successive images until the last capture image comprises the upper left corner of the planar object, capturing a second row of images by moving the optical axis of the camera lower and focusing below but overlapping the portion captured in the last captured image and continuously capturing images while moving the camera in a left to right direction at a speed that ensures the overlap between successive images until the last capture image comprises the right edge of the planar object, continuing capturing images in the manner of capturing the first and second rows stating with the portion of the planar object under but overlapping the last captured portion of the planar object until the entire last portion of the planar object is captured.

19. The computer-readable medium for converting a series of low resolution images of portions of a planar object into a high resolution image of said object of claim 13, wherein said planar object is a whiteboard.

20. The computer-readable medium for converting a series of low resolution images of portions of a planar object into a high resolution image of said object of claim 13, wherein said planar object is a piece of paper.

* * * * *